UNITED STATES PATENT OFFICE.

SAMUEL H. DOLBEAR AND JOHN WOODS BECKMAN, OF SAN FRANCISCO, CALIFORNIA.

PROCESS FOR THE PRODUCTION OF BARIUM CHLORID, MAGNESIUM CHLORID, &c.

1,279,090.

Specification of Letters Patent. Patented Sept. 17, 1918.

No Drawing.  Application filed October 5, 1915. Serial No. 54,150.

*To all whom it may concern:*

Be it known that we, SAMUEL H. DOLBEAR and JOHN W. BECKMAN, citizens of the United States, residing at San Francisco, in the county of San Francisco and State of California, have invented certain new and useful Improvements in Processes for the Production of Barium Chlorid, Magnesium Chlorid, &c., of which the following is a specification.

This invention relates to the treatment of salts of certain elements, such as barium, magnesium, and the like, for the production of barium chlorid, magnesium chlorid, sodium silicate, and other resulting compounds.

The object of the invention, broadly, is to utilize a chlorid of a metal (such as sodium chlorid) and an oxid (such as silicon dioxid) in connection with salts of such elements as barium, magnesium, etc., and, by heating and otherwise treating these, to produce resultant chlorids thereof, and, also, silicates and other compounds.

More specifically, the object of the invention is to utilize a substance containing chlorin (such as sodium chlorid), and silicon dioxid and, by a heat treatment thereof in connection with, say, barium sulfate, to produce barium chlorid, sodium silicate and other compounds; or, if magnesium carbonate is employed, to produce magnesium chlorid, sodium silicate, and other compounds.

The present invention is predicated upon the discovery that if certain compounds, such as barium sulfate, or magnesium carbonate, are heated in the presence of sodium chlorid and silicon dioxid—or in the presence of either of these materials, followed by a subsequent heating of the same in the presence of the other material—a chlorid and a silicate may, by the consequent chemical reactions which occur, be produced. In this manner, there may be economically produced barium chlorid and sodium silicate, or magnesium chlorid and sodium silicate, in forms well adapted to meet the requirements of commerce; and, at present, these are especially profitable in view of the serious interruption in the importation into this country from Europe of like chemicals, due to war conditions there. Other resultant compounds are also derived from such method of treatment.

For example, if barium sulfate is heated in the presence of sodium chlorid, there is produced a fused mass. If, now, this mixture is lixiviated, precipitation of the barium sulfate in a finely divided state will result, while the sodium chlorid passes into the resulting solution; after which the solution may be evaporated to dryness so that the residue may be heated in the presence of silicon dioxid: This will produce barium chlorid, sodium silicate, etc. In the same way, if magnesium silicate is subjected to the heat treatment in the presence of sodium chlorid, the resulting products would be magnesium chlorid, sodium silicate, etc. In these operations, certain chemical reactions occur, and we utilize these consequent chemical reactions in the following manner: Taking barium sulfate (preferably in a pulverulent form) as the substance to be treated, if sodium chlorid (also preferably in pulverulent form) is added, and if these two be then heated to a predetermined temperature, for example, 2000° F., a fused mass will result. This mass, being a mixture of barium chlorid and sodium sulfate, is then lixiviated, and this results in the precipitation of barium sulfate in a finely divided state. The solution is then, in any preferred manner, evaporated to dryness. The resultant mass is then heated in the presence of silicon dioxid, and this produces a fused mass of barium chlorid and sodium silicate.

It is to be understood that the heating of the barium sulfate in the presence of the sodium chlorid and the silicon dioxid results in the production of the aforementioned fused masses. The substances do not have to be mixed before fusion, it being found in practice that the sodium chlorid fuses at a very low temperature, and the other materials thereupon become mixed with the fused sodium chlorid without other mechanical treatment. Convenient separation of the contained salts may then be accomplished by reason of the fact that solubility is a characteristic of the barium chlorid, and relative insolubility is a characteristic of the sodium silicate. Hence, the separation of these from each other may be effected in any well known manner: The barium chlorid therein may be dissolved out of the fused mass, for example, by introducing into the mass sufficient water to make a solution, whereupon the chlorid, being soluble, may be separated from the sodium silicate which is, relatively, insoluble.

If magnesium compound be utilized, the procedure just described in connection with barium may be followed, resulting in the production of magnesium chlorid—which (like barium chlorid) is soluble in water—sodium silicate and other compounds that are relatively insoluble.

In lieu of the procedure described, for both barium and magnesium compounds, these two compounds may be subjected to a single heat treatment in the presence of both the sodium chlorid and silicon dioxid, together, whereupon the resulting fused mass is treated as already described.

In treating barium sulfate, the characteristic reactions may be symbolically expressed as follows:

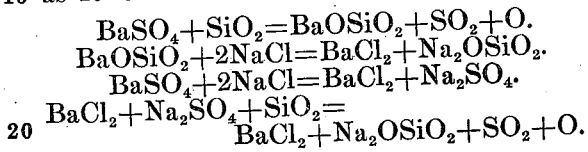

$$BaSO_4 + SiO_2 = BaOSiO_2 + SO_2 + O.$$
$$BaOSiO_2 + 2NaCl = BaCl_2 + Na_2OSiO_2.$$
$$BaSO_4 + 2NaCl = BaCl_2 + Na_2SO_4.$$
$$BaCl_2 + Na_2SO_4 + SiO_2 = BaCl_2 + Na_2OSiO_2 + SO_2 + O.$$

In treating magnesium carbonate, the characteristic reactions may be symbolically expressed as follows:

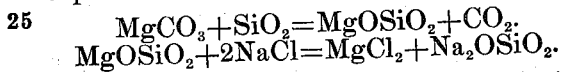

$$MgCO_3 + SiO_2 = MgOSiO_2 + CO_2.$$
$$MgOSiO_2 + 2NaCl = MgCl_2 + Na_2OSiO_2.$$

The heat treatment, already described, involves the subjection of one or the other specified compounds to an elevated temperature to effect the required chemical reactions. We have found, by experience, that the best results are secured by utilizing a temperature ranging from 1500° F. to 2500° F. In practice, a temperature of approximately 2000° F. may be most effectively utilized.

It is to be understood, of course, that the residues of the lixiviating step may be treated in any manner other than that described, to recover the valuable substances.

It is to be understood that in practising the foregoing process, we do not limit ourselves to any precise quantities of the sodium chlorid and silicon dioxid, since the desideratum is only that, in heat treatment, the barium or magnesium compounds (as the case may be) shall be converted into barium chlorid and magnesium chlorid. Nor do we limit ourselves, either, to the use of sodium chlorid, since any equivalent, capable of effecting the specified function, may be employed.

The invention may, therefore, be said to comprehend, broadly, the production of the chlorids of metals—other than the chlorids of alkaline metals—by heating a compound of the metal in the presence of another metal chlorid and an oxid; and, more specifically, the production of metal chlorids—other than chlorids of alkaline metals—by heating a compound of that metal in the presence of sodium chlorid and silica.

What we claim is:

1. A step in the method of producing barium chlorid, which consists in heating to fusion barium sulfate in the presence of sodium chlorid.

2. A step in the method of producing barium chlorid, which consists in heating barium sulfate to a point of sintering in the presence of silicon dioxid.

3. The method of producing barium chlorid, which consists in heating to fusion a mixture containing barium sulfate, silicon dioxid and sodium chlorid.

4. The method of producing barium chlorid, which consists in heating to fusion a compound of barium, in the presence of sodium chlorid and silicon dioxid to produce a fused mass, and dissolving out barium chlorid from the fused mass.

5. The method of producing barium chlorid which consists in heating to fusion a compound of barium in the presence of sodium chlorid, treating with water the mixture to produce barium sulfate in a finely divided state and sodium chlorid in solution, evaporating to dryness, and heating the residual mixture to fusion in the presence of silicon dioxid.

6. The method of producing barium chlorid which consists in heating a compound of barium to a temperature between approximately 1500° and 2500° Fahrenheit in the presence of sodium chlorid, treating with water the resultant mass to produce barium sulfate in a finely divided state, and sodium chlorid in solution, then reducing the residual mixture to dryness, and heating in the presence of silicon dioxid to a temperature ranging between approximately 1500° and 2500° Fahrenheit.

7. The method of producing barium chlorid, sodium silicate and other compounds, which consists in heating to approximately 2000° Fahrenheit a compound of barium in the presence of sodium chlorid, treating with water the resultant mass to form barium sulfate in a finely divided state and sodium chlorid in solution, evaporating to dryness the solution and heating the residual mixture to approximately 2000° Fahrenheit in the presence of silicon dioxid.

In testimony whereof we affix our signatures in presence of two witnesses.

SAMUEL H. DOLBEAR.
JOHN WOODS BECKMAN.

Witnesses:
A. B. TARPEY,
J. PAULDING EDWARDS.